United States Patent
Merati

(10) Patent No.: US 10,933,312 B2
(45) Date of Patent: Mar. 2, 2021

(54) SYSTEMS, APPARATUS AND METHODS FOR VERIFYING LOCATIONS

(71) Applicant: UPLAY1, San Diego, CA (US)

(72) Inventor: Bruce Merati, San Diego, CA (US)

(73) Assignee: UPLAY1, Las Vegas, NV (US)

( * ) Notice: Subject to any disclaimer, the term of this patent is extended or adjusted under 35 U.S.C. 154(b) by 0 days.

(21) Appl. No.: 16/542,111

(22) Filed: Aug. 15, 2019

(65) Prior Publication Data

US 2020/0061454 A1 Feb. 27, 2020

Related U.S. Application Data

(60) Provisional application No. 62/720,125, filed on Aug. 21, 2018.

(51) Int. Cl.
*A63F 13/00* (2014.01)
*A63F 13/216* (2014.01)
*A63F 13/73* (2014.01)
*A63F 13/211* (2014.01)

(52) U.S. Cl.
CPC .......... *A63F 13/216* (2014.09); *A63F 13/211* (2014.09); *A63F 13/73* (2014.09); *A63F 2300/205* (2013.01); *A63F 2300/5573* (2013.01)

(58) Field of Classification Search
None
See application file for complete search history.

(56) References Cited

U.S. PATENT DOCUMENTS

| | | | | |
|---|---|---|---|---|
| 5,347,645 A | * | 9/1994 | Perry | G01S 7/021 713/502 |
| 5,561,836 A | * | 10/1996 | Sowles | H04B 7/18545 455/428 |
| 7,828,654 B2 | * | 11/2010 | Carter, Sr. | G07F 17/3223 463/29 |
| 8,542,251 B1 | * | 9/2013 | Gossweiler, III | G06F 21/36 345/649 |
| 10,229,561 B2 | * | 3/2019 | Cage | A63F 13/216 |
| 2004/0242201 A1 | * | 12/2004 | Sasakura | H04W 12/0802 455/411 |
| 2008/0268931 A1 | * | 10/2008 | Alderucci | G07F 17/3209 463/11 |
| 2008/0300055 A1 | * | 12/2008 | Lutnick | G06F 3/011 463/39 |
| 2009/0197684 A1 | * | 8/2009 | Arezina | G07F 17/34 463/42 |
| 2009/0265627 A1 | * | 10/2009 | Kim | G06F 1/1694 715/702 |
| 2010/0104220 A1 | * | 4/2010 | Gossweiler, III | G06T 7/70 382/296 |
| 2011/0034252 A1 | * | 2/2011 | Morrison | G07F 17/3223 463/42 |
| 2011/0306304 A1 | * | 12/2011 | Forutanpour | H04M 1/72572 455/67.11 |
| 2012/0046096 A1 | * | 2/2012 | Morrison | G07F 17/3237 463/25 |

(Continued)

*Primary Examiner* — Paul A D'Agostino
(74) *Attorney, Agent, or Firm* — Thibault Patent Group

(57) ABSTRACT

A system, method and method for verifying a location of a mobile device by providing instructions to a user of the mobile device to physically manipulate the mobile device, and determining whether the mobile device was, in fact, physically manipulated according to the instructions.

18 Claims, 4 Drawing Sheets

(56) References Cited

U.S. PATENT DOCUMENTS

| | | | | |
|---|---|---|---|---|
| 2012/0240195 A1* | 9/2012 | Weiss | H04L 63/107 | 726/4 |
| 2012/0262386 A1* | 10/2012 | Kwon | G06F 3/04886 | 345/173 |
| 2014/0370959 A1* | 12/2014 | Yacenda | G07F 17/3241 | 463/18 |
| 2015/0105017 A1* | 4/2015 | Holmquist | H04M 1/72552 | 455/41.2 |
| 2016/0018900 A1* | 1/2016 | Tu | G06F 1/3218 | 345/156 |
| 2016/0021238 A1* | 1/2016 | Abramson | G06F 3/013 | 455/418 |
| 2016/0065523 A1* | 3/2016 | Hintz | H04L 51/20 | 709/206 |
| 2016/0241543 A1* | 8/2016 | Jung | G06F 21/35 | |
| 2016/0345176 A1* | 11/2016 | DeWitt | H04W 4/12 | |
| 2017/0193526 A1* | 7/2017 | Turgeman | G06Q 20/401 | |
| 2018/0314816 A1* | 11/2018 | Turgeman | G06F 3/0486 | |
| 2019/0132165 A1* | 5/2019 | Shieh | H04L 1/0003 | |
| 2019/0220863 A1* | 7/2019 | Novick | G06Q 20/10 | |
| 2019/0222400 A1* | 7/2019 | Bagheri | H04W 72/042 | |
| 2019/0286806 A1* | 9/2019 | Robinson | H04W 12/06 | |
| 2020/0220715 A1* | 7/2020 | Fiske | H04L 9/14 | |

\* cited by examiner

SYSTEMS, APPARATUS AND METHODS FOR VERIFYING LOCATIONS

CROSS-REFERENCE TO RELATED APPLICATIONS

This application claims the benefit of U.S. provisional patent application Ser. No. 62/720,125, filed on Aug. 21, 2018.

BACKGROUND

Field of Use

The present application relates to the field of position determination techniques and more specifically to a system, apparatus and method for verifying a geolocation of a person engaged in regulated online gaming and sports wagering.

Description of the Related Art

Licensed online gaming and sports wagering providers operating in a regulated jurisdiction are subject to extensive gaming laws and regulations mandating authentication of a gamer's physical location to be restricted to permissible areas such as boundaries of a gaming establishment or a state. For example, in a state such Nevada and New Jersey, where online gaming or sports wagering is legal, operators are obligated to restrict gaming within the state's borders and prevent residents from other states, such as Utah, which do not allow any form of online or mobile gambling from participating in such online gaming. Overall, gambling laws and regulations require licensed operators to follow a strict geolocation process and limit gaming within the boundaries of an approved area such as inside a casino or within the borders of a state.

With the recent approval and popularity of regulated online gaming, a challenge presented to gaming operators is how to verify that an online user is, in fact, physically present in a particular jurisdiction that allows such regulated gaming. Put another way, the challenge for online gaming operators is how to verify a user's location, especially when tools are available to users to "spoof" their location and fool online gaming operators that they are physically present within a legal gaming jurisdiction when, in fact, they are not.

Accordingly, it would be desirable to verify the location of users online in order to comply with regulations mandating that online users be physically present within a geographic area in order to participate in online gaming.

SUMMARY

A server for verifying a position of a remote game player using a client device coupled to the server via a wide-area network, comprising, a geolocation module for determining a position of client device, a network interface for sending and receiving information over the wide-area network, a memory for storing processor-executable instructions; and a processor coupled to the geolocation module, the network interface, and the memory for executing the processor-executable instructions that causes the server to receive, by the processor via the network interface, a request from the remote game player via the client device to participate in an online game hosted by the server, send, by the processor via the network interface, instructions for the remote game player to physically manipulate the client device, determine, by the geolocation module, positions of the client device as the remote game player manipulates the client device over time, determine, by the processor, that the positions of the client device match expected positions associated with the instructions and grant to the client device, by the processor, access to the online game when the positions of the client device matches the expected positions.

In another embodiment, a method is described, performed by a server, for verifying a location of a remote game player using a client device coupled to the server via a wide-area network, comprising, receiving, by a processor via a network interface coupled to the processor, a request from the remote game player via the client device to participate in an online game hosted by the server, sending, by the processor via the network interface, instructions for the remote game player to physically manipulate the client device, determining, by a geolocation module coupled to the processor, positions of the client device as the remote game player manipulates the client device over time, determining, by the processor, that the positions of the client device match expected positions associated with the instructions and granting to the client device, by the processor, access to the online game when the positions of the client device matches the expected positions.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The ideas presented herein relate to various embodiments of a geolocation verification system, apparatus and method for determining a location of a person connected to a service provider such as an online gaming or sports wagering provider. In one embodiment, a location of a person is determined, in part, by a computer server that provides instructions to a person using a mobile device to perform certain acts, such as rotating in a certain direction by a certain number of degrees, or instructing the person to move in a particular direction by a certain distance. Further, a number of techniques are described for detecting suspicious activities, such as possible use of various types of IP address spoofing programs in order to pretend physical presence in another area or jurisdiction.

It should be noted that while one embodiment of the invention is described herein as relating to a game server offering online wagering games to remote game players, the techniques described herein may have greater utility beyond online gaming and may be used for other purposes where location verification is needed, such as applicability of state sales tax on an e-commerce transaction. As an example, if a user makes a purchase that does not involve physical delivery, e.g. a service such as purchase of an educational course or a software, the user could potentially be able to escape the state's sales tax by pretending presence in a state that does not have a sales tax or is not subject to a sales tax for that product or service.

Also it should be noted that throughout this disclosure the word "device", "mobile device" or "client device" may be used interchangeable and refer to a smartphone such as an Apple iPhone, a RIM Blackberry, a Google Android smartphone, a Windows operating system smartphone, a desktop computer, a laptop computer, or any other mobile processing device, that the words "gamer", "player", "user", and "client" may be used interchangeably, and that the words "state", "jurisdiction" and "area" may be used interchangeably. Also, the words "program", "application" and "app" are also used interchangeably. Finally, the words "position" and "location" are used interchangeably herein, referring to an orientation (i.e., a rotation of a mobile device in a particular direction, i.e., as in a compass heading) or a physical location of a mobile device (referenced by a GPS location system, terrestrial cellular systems, local "beacons", such as BLE beacons, reverse IP lookup services, or some other position determining system or apparatus.

Figure 1:
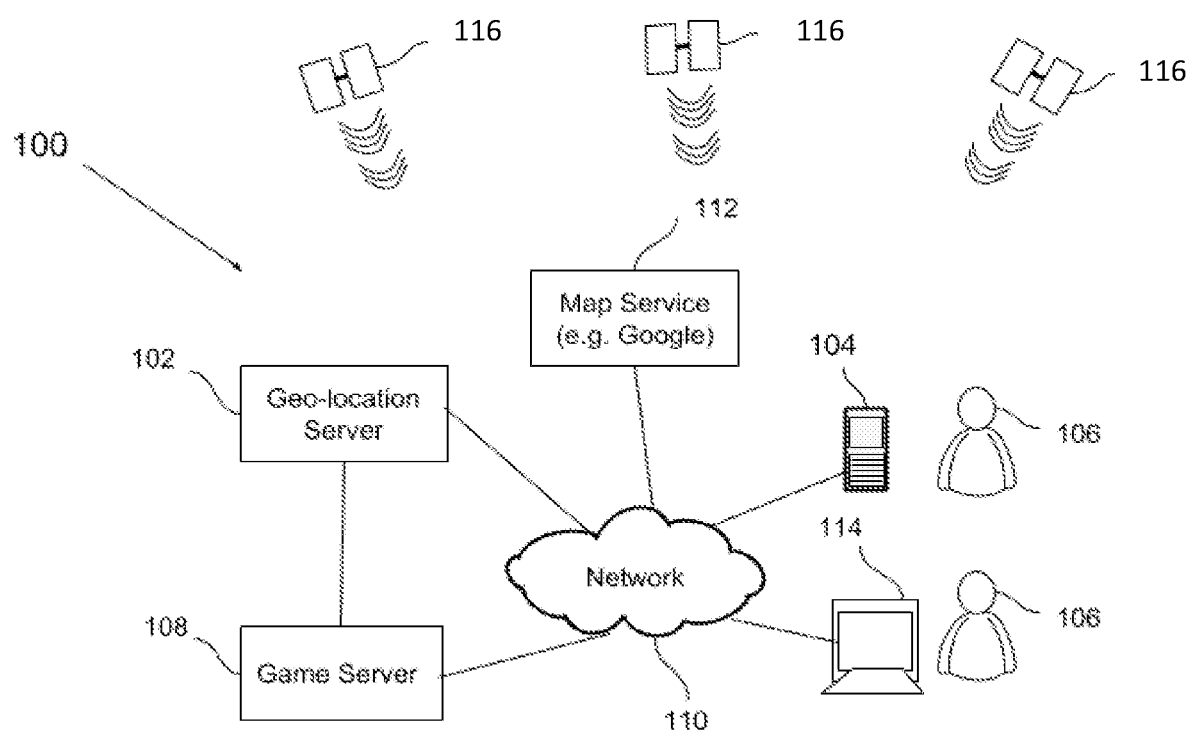
FIG. 1 is a block diagram of one embodiment of a system for determining a location of a client device coupled to a server over wide-area network.

FIG. 1 is a block diagram of one embodiment of a system 100 for determining a location of a client device 104 coupled to a server 108 over wide-area network 110 (i.e., the Internet and/or a cellular data network). In this embodiment, system 100 may additionally comprise a geolocation server 102, laptop/desktop computer 114, mapping server 112 (such as a server operated by Google that provides mapping information to users) and GPS satellites 116. In one embodiment, user 106 may use laptop/desktop 114 to connect to server 108 in which case user 106 may be notified by server 108 to use client device 104 for geolocation purposes. In one embodiment, user 106 is a remote game player who plays wagering games provided by server 104, and server verifies a location of the remote game player to ensure that the remote game player is physically located in a jurisdiction that allows online wagering.

Geolocation server 102 comprises a computer server, coupled to game server 108, configured for determining a position of user 106 via signals received from user 106's client device 104, such as GPS readings, nearby WIFI router data, raw or processed GPS data, accelerometer data and compass heading readings, or other signals that may be provided by client device 104. Client device 104 may comprises a smart phone, tablet computer, laptop computer, wearable, or some other electronic computing device capable of communication with wide-area network 110. In some embodiments, the functionality of geolocation server 102 may be incorporated into server 108.

In one embodiment, sever 108 comprises a computer server or computer system that provides online gaming services to remote players over wide-area network 110. Popular online games such as blackjack, various forms of poker, roulette, and other games may be offered by server 108. In other embodiments, server 108 may be configured to provide other online services, such as online retail sales, and location verification is used to assign the proper amount of jurisdictional taxes to purchases, retail rewards services, where verification of users in a venue is desired.

GPS satellites 116 are well-known in the art for providing signals that allow various electronic devices, such as client device 104, mapping server 112 and geo-location server 102, to determine a location of client device 104 almost anywhere on earth. It should be noted that mapping server 112 may also use other data than those provided by GPS satellites, such as coordinates of nearby cell-towers and WIFI routers.

The purpose behind using such additional data is to increase the location accuracy of the device.

Embodiments of the present invention present novel solutions for online gaming providers that utilize server 108 and/or or geo-location server 102, to verify that user 106 is actually within an approved wagering area (such as inside a casino) or jurisdiction (such as inside a state or country that allows online gaming).

For the remaining discussion of the embodiments herein, reference shall be made to server 108 performing the functions necessary to verify a location of user 106, although server 108 could also perform this functionality, alternatively or in addition, to geo-location server 102 and/or mapping server 112.

In one embodiment, game server 106 may first determine a type of client device 104 in order to determine whether or not client device 104 is capable of determining its location, i.e., by using geolocation technology embedded into client device 104, such as in connection with GPS satellites 116 and/or using one or more software applications executed by client device 104, an internal compass, an accelerometer, potentially with external services provided by, for example, mapping server 112. Modern tablets and smartphones comprise hybrid GPS solutions that use a combination of signals from satellites, cell towers and other devices such as Wi-Fi routers of public and private networks to determine a device's location. Utilizing this technology, smartphones such as Apple iPhone and Android phones provide 1 to 3 meters of accuracy of the device's location, however, newer GPS chips and hybrid positioning processes that use aerial as well as indoor GPS signals could increase this accuracy.

Embodiments of the invention describe a number of technics to detect suspicious activities, such as possible use of various types of IP address spoofing programs e.g. proxy servers, VPNs, screen sharing or any other methods for user 106 to spoof an IP address of client device 104 or the coordinates of client device 104 in order to pretend physical presence in another area or jurisdiction.

In one embodiment, server 108 generates instructions for user 106 and/or client device 104 to perform that may get triggered at different stages of an online activity, such as at registration, login or upon occurrence of a certain event such as at the time of placing a wager. The instruction(s) maybe generated randomly to make it unpredictable to user 106 or to client device 104. For example, an instruction to user 106 may comprise a text message to rotate client device 104 to the left or to the right by various degrees such as 45, 90, 180, 360 etc. or to take one, two or three steps in random directions while holding client device 104, and further instructions could be sent to client device 104 for client device 104 to detect that the player is at the device. Rotation of a mobile device may be captured by an internal accelerometer or compass, which may be sent via map software such as HTML5 Geolocation API. In general, a purpose of sending user 106 instructions is to ensure that user 106 is physically present at a location as indicated by client device 104. By utilizing specific instructions that may be randomly generated and capturing an orientation or coordinates of client device 104 during movement of client device 104 as instructed, server 108 establishes whether data reported back from client device 104 matches with expected manipulations of client device 104 in accordance with the instructions, as determined by the orientations, coordinates or a rate at which a GPS module and/or other circuitry/firmware for determining a location of client device 104, provided by client device 104. If the manipulations of client 104 are not as expected, this may indicate that user 106 is not, in fact, located where client device 104 indicates, and server 108 may respond by preventing user 106 from placing a wager or otherwise participating in a wagering game. It should be noted that geo-location server 102 may be configured to detect fake GPS software which a user may install on client device 104 to spoof his or her location. The detection may be established based on a rate at which client device 104 updates its location, in one embodiment, based at least in part on GPS signals from satellites 116. Generally, the rate at which client device 104 updates its position varies as client device 104 is moved, moved indoors (where GPS information may be supplemented with terrestrial or local-network assistance), one or more satellites 116 come into view or fall below the horizon, and/or other factors. Apps and online services are available to spoof the location of client device 104. However, these apps and services generally provides a single, spoofed location, such as inside a venue or jurisdiction that does allow online wagering, and the rate at which the fake location is generated generally remains fixed.

In one embodiment, when server 108 determines that user 106 is using a device that has no GPS, accelerometer or compass, for example desktop/laptop 114, in which case server 108 may instruct user 106 to obtain and use a device that is capable of determining its location, e.g. client device 104, and issues a passcode to client device 114. The user may then be provided with a predetermined time to enter the passcode into desktop/laptop 114, where server 108 may then confirm that desktop/laptop 114 and client device 104 are close to each other, using an IP address of desktop/laptop 114 and location information from client device 104.

In another embodiment where user 106 attempts to place a wager or otherwise participate in a game offered by server 108 using a device that is incapable of accurate location determination (i.e., desktop/laptop 114), when user 106 tries to register or login to server 108, or place a wager, then server 108 may initiate a two-step authentication process, whereby user 106 is asked by server 108 to use a mobile device, such as client device 104, as described in the above paragraphs as the first step, followed with a second step for server 108 to verify the IP address of both devices to ensure they are in the vicinity of each other. If it is established that the location of the two are within a predetermined range from each other, then server 108 may send a computer generated PIN, a passcode, a bar code, a QR code, or some other unique designator to client device 104 for entry into desktop/laptop 114. It should also be noted that the PIN or the passcode provided to user 106 may expire within a short period of time, say one minute. Alternatively, the PIN or the access code may be passed on to another device using a process called "handoff" that seamlessly transfers a page from a mobile device to a laptop/desktop in its close proximity using Bluetooth and other technologies such as Near Field Communication (NFC).

In yet another embodiment where user 106 attempts to place a wager or otherwise participate in a game offered by server 108 using a device that is incapable of accurate location determination (i.e., desktop/laptop 114), server 108 may send a PIN, a passcode, a bar code, a QR code, or some other unique designator to the device that does not have accurate location capabilities (i.e., to desktop/laptop 114), and client device 104 reads the designator from desktop/laptop 114 using scanning, photographic, or handoff techniques well known in the art. After reading the designator, client device 104 may be directed to a webpage with instructions for user 106 to follow, i.e., instructions to manually manipulate client device 104, such as by rotating or moving linearly, as described earlier, in order to verify that user 106 is, indeed, in proximity to client device 104 and, thus, within a predetermined geographic boundary approved for wagering.

Server 108 may use geolocation data from various sources, such as client device 104, cell towers, Wi-Fi information of public and private networks, etc., as well as apps and/or web services (including online maps, IP reverse look up services and diagnostics provided by client device 104) to determine if client device 104 is using applications that could report false location results. In order to determine if user 106 is using such spoofing technology, server 108 may provide instructions to user 106 to perform certain acts, such as rotating client device 104 or walking with client device 104 in one or more directions, and polling client device 104 for client device 104 to provide raw or processed GPS information, compass headings or accelerometer readings. Server 108 then uses this data to make a determination as to whether to accept a request from user 106 to gain access to server 108 for the purpose of placing a wager if the signals from client device 104 are determined to be authentic, and if the location as provided by client device 104 is within a geographic area that permits online wagering.

In one embodiment, server 108 calculates a "risk score" associated with user 106, for determining a likelihood that user 106 is within an allowed gaming area or jurisdiction. Depending on the score, server 108 may instruct user 106 to travel to a location where a live person establishes the location of user 106.

In some embodiments, server 108 may create a whitelist database comprising identifying information of player devices (such as a MAC address, IP address, etc.) and/or player information (such as name, user ID, etc.) that have undergone several successful location verifications. Alternatively, or in addition, server 108 may generate and maintain a blacklist database storing identification information of devices and/or players that have failed several attempts of location verification.

Once server 108 verifies a geolocation of user 106, it may perform one or more further checks, either periodically or upon occurrence of an event, e.g. before placement of a wager, making sure user 106 is still within the jurisdiction and has not travelled or walked pass its boundaries.

Figure 2:
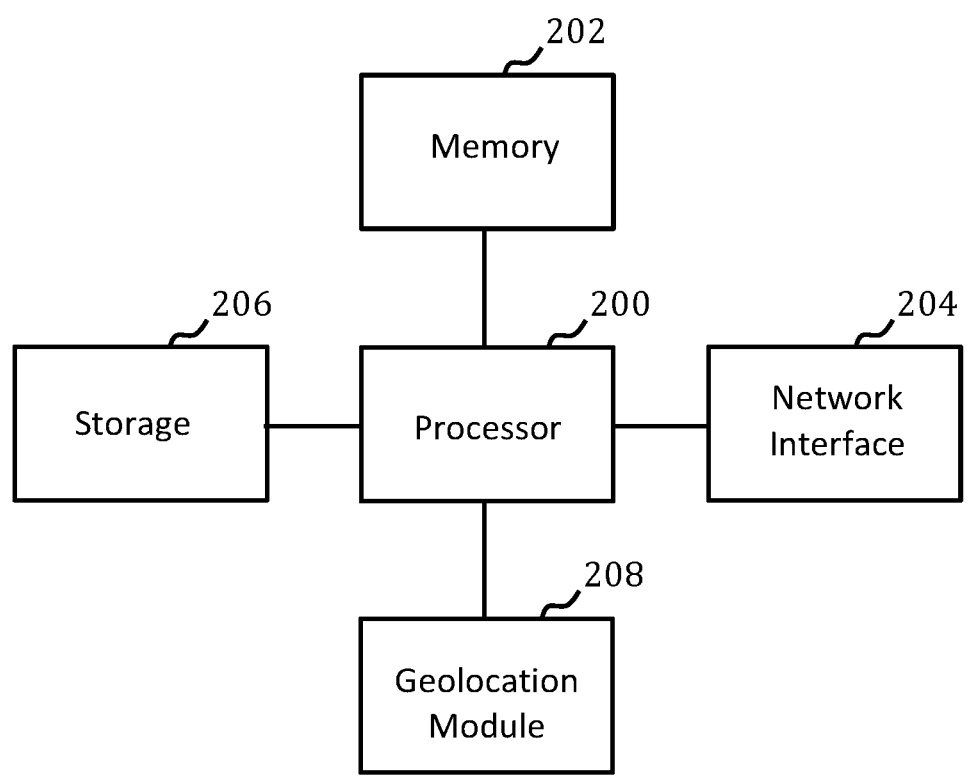
FIG. 2 is a functional block diagram of one embodiment of the game server shown in FIG. 1.

FIG. 2 is a functional block diagram of one embodiment of server 108, comprising processor 200, memory 202, network Interface 204, storage 206, and geolocation module 208. It should be understood that the functional blocks shown in FIG. 2 could be arranged in different manners in other embodiments, and that some basic functional blocks have been omitted, for clarity.

Processor 200 comprises one or more general-purpose or specialized microprocessors, microcomputers, microcontrollers and/or custom or semi-custom ASICs to perform aspects of online gaming, such as creating/maintaining player accounts, conducting online gaming, and location verification as described herein.

Memory 202 comprises one or more information storage devices, such as RAM, ROM, EEPROM, UVPROM, flash memory, or some other electronic, optical or mechanical information storage device. Memory 202 stories processor-executable instructions for execution by processor 200 and other information, such as information required for player location verification operations, such as instructions for players to conduct manual exercises (i.e., phone rotation, walking directions, etc.) and a database of IP addresses cross-referenced to geographical information, such as a geographic area associated with each IP address, in an embodiment where players' locations are determined based on their device's IP address. It should be understood that in some embodiments, at least some of memory 202 may be part of processor 200.

Network interface 204 comprises circuitry necessary for server 108 to communicate over one or more digital networks, such as wide-area network 110 (i.e., the Internet, cellular data networks) and/or one or more local-area networks (such as a home Wi-Fi networks). Such circuitry is well known in the art.

Storage 206 comprises a mass data storage device, such as a hard drive, solid state drive (SSD), tape drive, or some other electronic, optical or mechanical information storage device, typically used to store large volumes of information, such as a player account information, executable instructions for each game, etc.

Geolocation module 208 is coupled to Processor 200 and may comprise its own microprocessor, memory and other electronic components to determine player locations using signals provided by players' mobile devices. Such circuitry is well known in the art. The signals provided by mobile devices may comprise GPS signals, cellular signals, Wi-Fi routers, or other signals for determining a location of player and the player's mobile device. Current smartphones such as Apple iPhone and Android phones provide 1 to 3 meter accuracy in reading the coordinate of a location, however, a hybrid positioning process that uses aerial as well as indoor signals and newer GPS Chips increases the accuracy.

Figure 3A:
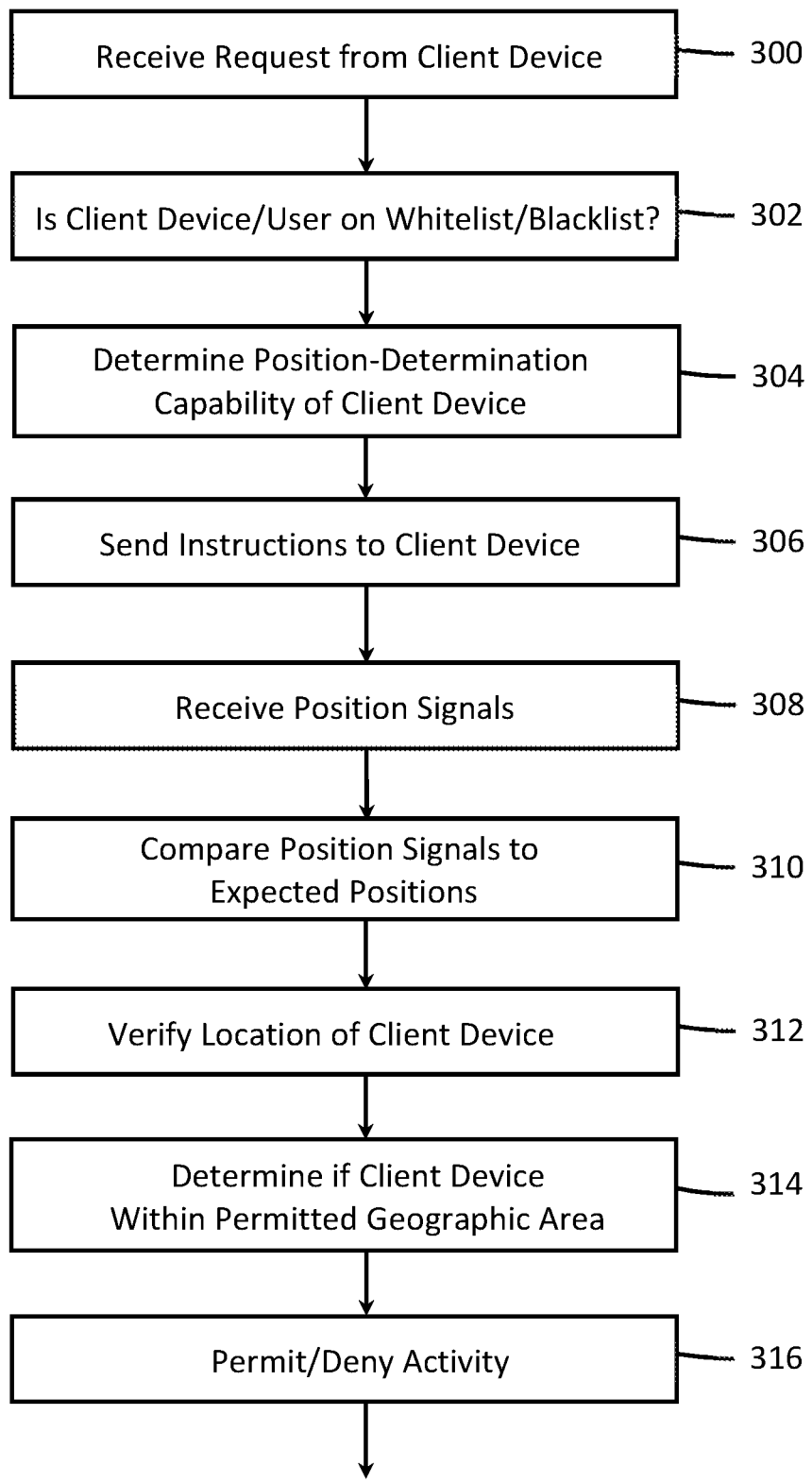
FIGS. 3A and 3B are flow diagrams illustrating one embodiment of a method for verifying a position of a client device.
Figure 3B:
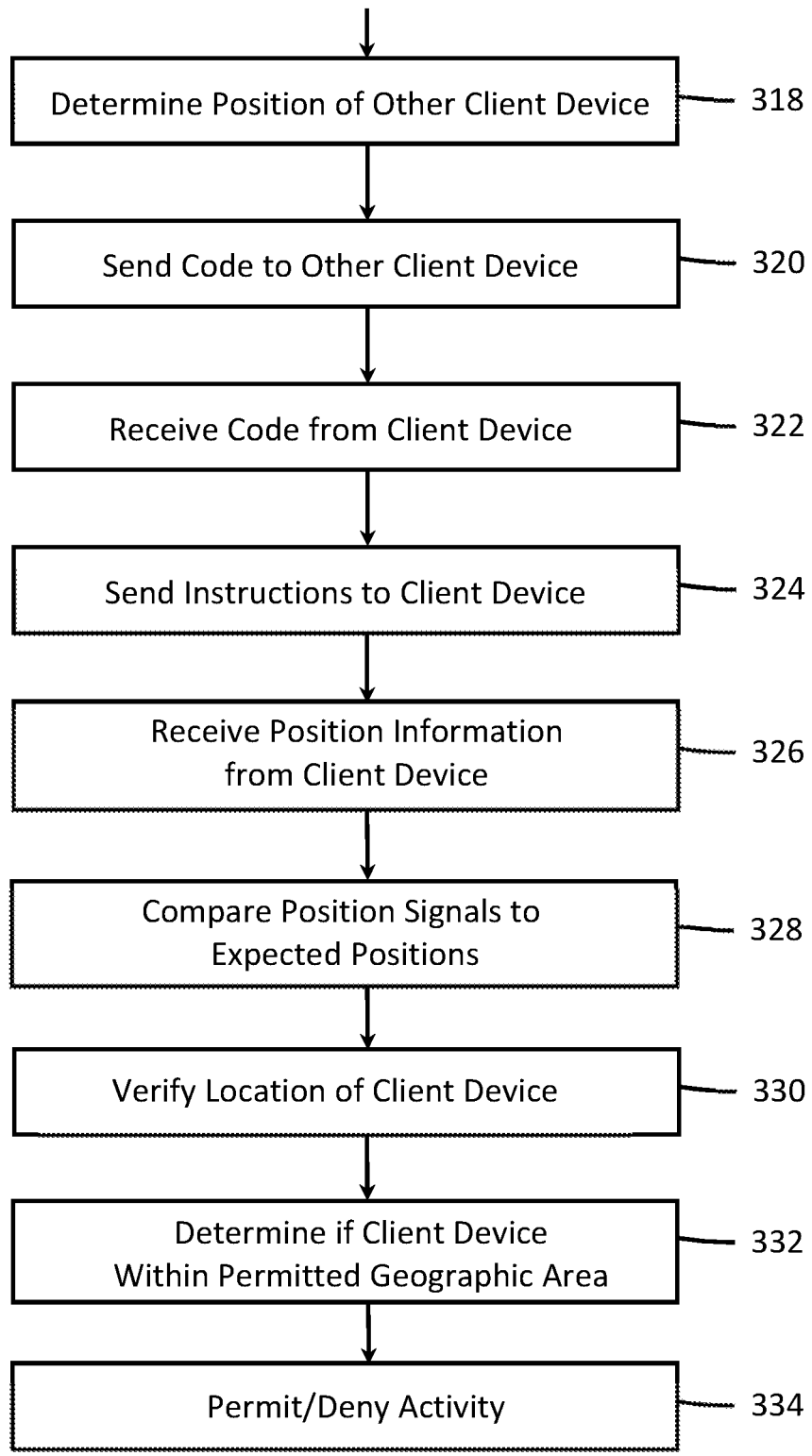

FIG. 3 is a flow diagram illustrating one embodiment of a method, performed by processor 200, for verifying a position of a client device. It should be understood that in some embodiments, not all of the method steps shown in FIG. 3 are performed, and that the order in which the steps are performed may be different in other embodiments.

At block 300, processor 200 receives a request from client device 104 via network interface 204 and wide-area network 110 for a remote game player 106 to participate in an online game offered by server 108. The request may be generated by client device 104 as remote game player 106 interacts with an app executed by the client device, and may be sent to server 108 during a registration event, a login event, sent randomly, periodically, or upon occurrence of a certain event, such as when remote game player 106 places of a wager. The request typically comprises identification information, identifying client device 104 (such as an IMSI, phone number, MAC address, an IP address, etc.) and/or remote game player 106 (i.e., username, phone number, account number, etc.). In one embodiment, the request comprises position information of client device 104, for example, raw GPS coordinates, a calculated location based on GPS and/or terrestrial networks, a compass heading. In a related embodiment, position information is requested by processor 200 via network interface 204 and wide-area network 110, and client device 104 provides the position information in response.

At block 302, in one embodiment, processor 200 determines if client device 104 or remote game player 106 is listed on a whitelist or a blacklist stored by memory 202. The whitelist comprises a list of client devices and/or game players that have been previously verified before as accurately providing their location information. The blacklist comprises a list of client devices and/or game players that have previously failed location verification previously. Each list may identify client devices and players by the identification information found in the request, as received at block 300. If client device 104 or remote game player 106 is found on the whitelist, processor 200 accepts the remote game player's request, and allows remote game player to access an online game. If client device 104 or remote game player 106 is found on the blacklist, processor 200 rejects the remote game player's request, and blocks remote game player from accessing an online game.

At block 304, in one embodiment, processor 200 sends an inquiry to client device 104, requesting that client device 104 inform server 108 of its position determination capabilities. In response, processor 200 may receive raw GPS signals received from GPS satellites 116 or processed GPS data in the form of geo-coordinates, such as latitude and longitude coordinates, a compass heading, accelerometer readings, or some other information pertaining to the location, position or orientation of client device 104.

At block 306, processor 200 generates and sends instructions to client device 104 via network interface 204 and wide-area network 110 for remote game player 106 to perform one or more actions, such as to manipulate client device 104, i.e., rotate client device 104 into a particular orientation (i.e., north, south, 90 degrees, 180 degrees, etc.), move client device 104 in a particular direction (i.e., left, right, north, south, east, northwest, etc.), move client device 104 in a particular direction for a particular distance (such as 20 feet, 18 steps, etc.), or a combination of these. The instructions may be based on whether client device 104 provided its position determination capabilities to server 108. For example, if client device 104 provided GPS coordinates to server 108 at block 304, processor 200, in response, may generate instructions that direct remote game player 106 to move client device 104 in a particular direction and/or for a particular distance. If client device 104 provided a compass setting to server 108 at block 304 processor 200, in response, may generate instructions that direct remote game player 106 to rotate client device 104 to a particular orientation or angle. If no position information was provided previously, processor 200 may perform other steps, as detailed at blocks 318-334. Further, details of the instructions could be generated randomly, so that remote game player 106 cannot anticipate what server 108 will require in order to validate his or her position. For example, processor 200 could randomly generate one or more directions of movement, distances, and/or orientations of client device 104.

The instructions may comprise visual or audio signals instructing remote game player 106 to manipulate client device 104, such as a text message or in-app message displayed on client device 104, or verbal instructions produced by a speaker of client device 104.

At block 308, processor 200 receives one or more position signals from client device 104 over a time period long enough to enable remote game player 106 to perform the instructions, such as 20 or 30 seconds. The signals may be processed by processor 200 or geolocation server 102, or some other component to determine one or more positions of client device 104 as the instructions are performed.

At block 310, processor 200 determines if the positions of client device 104 during the time when remote game player performs the instructions substantially match one or more expected manipulations of client device 104, as determined by reported positions from mobile device 104, as either determined by processor 200, or stored in memory 202. This is achieved by evaluating reported locations by client device 104, for example, GPS positions, beacon positions, compass headings, accelerometer readings, etc. For example, if client device has previously reported its position to server 108, and the instructions required the remote game player to travel north for 20 feet, at the conclusion of the instructions, the expected location of client device 104 would be 20 feet north from the initial position report. Processor 200 compares the position signals from client device 104 to one or more expected positions to determine if any of the position signals indicate that remote game player 106 has followed the instructions, i.e., that position signals from the remote game player indicate that client device 104 has been moved 20 feet north, i.e., to the expected position, resulting in an expected manipulation of client device 104. Similarly, if the instructions required the remote game player to rotate client device 104 to the north, processor 200 compares the position signals from client device 104 to one or more expected orientations, in this case north, to determine whether a match has occurred. In some embodiments, geolocation server 102 may aid in the aforementioned process of determining positions of client device 104.

In another embodiment, processor 200 determines how often a GPS device inside client device 104 updates its location information, i.e., an update rate, during the time when user 106 performs the instructions. Geo-location coordinates from a GPS device inside client device 104 are typically updated at varying rates while client device 104 is manipulated by user 106, due to movement factors such as changes in orientation or location of client device 104, and may be further influenced by whether the GPS device is utilizing location assist signals from a terrestrial network, Wi-Fi network, beacons, or some other location-assisting device or system. Processor 200 receives several GPS coordinates from client device 104 while user 106 physically manipulates client device 104 per the instructions provided to user 106 earlier. Processor 200 determines a rate at which the GPS coordinates are received, then compares this rate to an expected rate of change, based on the instructions. For example, if user 106 was instructed to rotate client device 106 three times within 10 seconds, the expected rate of change of GPS locations from client device to be once every 3.33 seconds. When the determined rate of received GPS locations matches the expected rate, processor 200 verifies the location of client device 104.

In yet another embodiment, the instructions comprise one or more commands for user 106 to rotate client device 104 at least 360 degrees. The instructions may be generated based on a determination by processor 200 that client device 104 is capable of generating signals from an onboard accelerometer or other circuitry/firmware within client device 104 to indicate an acceleration of client device 104. When user 106 rotates client device, in one embodiment, 360 degrees, processor 200 receives signals the accelerometer signals from client device 104 relating to the rotational acceleration of client device 200 as user 106 rotates client device 106. Then, processor 200 compares these signals to expected acceleration signals, either stored in memory 202 or generated by processor 200 based on the instructions, to determine whether client device 104 was manipulated in accordance with the instructions, i.e., that client device 104 was rotated in a certain direction, rotated by a number of degrees as specified in the instructions, etc.

At block 312, if processor 200 determines that the position of client device 104 substantially matches one or more expected positions, indicating an expected manipulation of client device 104, the position of client device 104 is verified, i.e., the actual position of client device 104 is known. "Substantially" matching means at least one reported position of client device 104 matches at least one expected position, but in practice, substantially matching means a majority of the reported positions match one or more expected positions, and in some cases, a large majority, such as 80%. If processor 200 determines that the manipulation of client device 104 does not match one or more expected manipulations, the position of client device 104 is unverified, meaning that the actual location of client device 104 is unknown.

In an embodiment where the update rate of client device 104 (i.e., from the GPS device inside client device 104) is determined by processor 200, processor 200 determines if the update rate has changed at least once during the time that user 106 performs the instructions. If processor 200 determines that the update rate has changed during the time that user 106 performs the instructions, the position of client device 104 is verified.

At block 314, in one embodiment, after processor 200 has verified the location of client device 104, processor 200 may determine whether client device 104 and, by extension, remote game player 106, is within a geographical area that allows online gaming, i.e., games where wagering is legal. The geographical area could be a casino, an Indian reservation, a county, a state, etc. Processor 200 may determine whether client device 104 is within a particular geographic area by utilizing an online service to map the position of client device, such as a mapping server offered by Google, or by other techniques well known in the art.

At block 316, if client device 104 is within the geographic area, processor 200 permits the remote game player access to one or more online games offered by server 108, or otherwise permits the request received at block 300. If client device 104 is not within the geographic area, processor 200 blocks remote game player 106 from accessing online games offered by server 108, or otherwise denies the request received at block 300. Such approval or denial may be communicated to client device 104 in a message sent by processor 200 via network interface 204 and wide-area network 110.

At block 318, if client device 104 does not have self-position determining capabilities, i.e., desktop computer 114 that lacks GPS processing, an accelerometer or a compass, processor 200 may determine a "rough" location of desktop computer 114 by evaluating an IP address provided by desktop computer 114 at block 300, or at some other time. Processor 200 may utilize an online, "reverse IP lookup" service via network interface 204 and wide-area network 110, which provides some degree of accuracy, for example, within a city.

At block 320, processor generates and sends a code and instruction to remote game player 106 via network interface 204, wide-area network 110 and desktop computer 114, instructing remote game player to obtain a client device that provides for self-determining position capabilities, i.e., client device 104, such as a smartphone having GPS and/or terrestrial location capabilities. The code may be randomly generated by processor 200 and comprise a numeric or alpha-numeric string, a bar code, a QR code, etc. The instructions may be in the form of an audio or text message, displayed by desktop computer 114 to remote game player 106. The instructions further instruct remote game player transfer the code to the obtained client device, and transmit the code back to server 108. In one embodiment, the instructions comprise an IP or web address where the code should be sent and, in one embodiment, establishes a communication link with server 108 for sending position signals, as described below.

At block 322, processor 200 receives the code from the obtained client device via network interface 204 and ensures that it has been received within a predetermined time from when processor 200 send the code to desktop computer 114, such as between 1 and 3 minutes. The relatively short time period may give a greater likelihood that desktop 114 is physically near the obtained client device.

At block 324, in response to receiving the code from the obtained client device, processor 200 generates and sends instructions to instructions to client device 104 via network interface 204 and wide-area network 110 for remote game player 106 to perform one or more actions, such as to manipulate client device 104, i.e., rotate client device 104 into a particular orientation, as described above at block 306.

At block 326, processor 200 receives one or more position signals from the obtained client device over a time period long enough to enable remote game player 106 to perform the instructions, such as 20 or 30 seconds, as described above at block 306.

At block 328, processor 200 determines if the positions of the obtained client device during the time when remote game player performs the instructions substantially match one or more expected positions as either determined by processor 200, or stored in memory 202, or if the update rate has changed, as described above at block 310.

At block 330, if processor 200 determines that the position of the obtained client device substantially matches one or more expected positions, or that the update rate has changed, the position of obtained client device is verified, i.e., the actual position of the obtained client device is known, as described above at block 312. If processor 200 determines that the position of the obtained client device does not match one or more expected positions, or that the update rate has not changed, the position of the obtained client device is unverified, meaning that the actual location of the obtained client device and, therefore, desktop computer 114 is unknown.

At block 332, in one embodiment, after processor 200 has verified the location of the obtained client device, processor 200 may determine whether the obtained client device and, by extension, desktop computer 114 and remote game player 106, is within a geographical area that allows online gaming, i.e., games where wagering is integral, as described at block 314, above.

At block 334, if the obtained client device and, therefore, desktop computer 114 and remote game player 106, is within the geographic area, processor 200 permits remote game player 106 access to one or more online games offered by server 108 using either desktop computer 114 or the obtained client device, or otherwise permits the request received at block 300. If the obtained client device is not within the geographic area, processor 200 blocks both desktop computer 114 and the obtained client device from accessing online games offered by server 108, or otherwise denies the request received at block 300. Such approval or denial may be communicated to desktop computer 114 and/or the obtained client device in a message sent by processor 200 via network interface 204 and wide-area network 110.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A server for verifying a position of a remote game player using a client device coupled to the server via a wide-area network, comprising:
    a geolocation module for determining a position of the client device:
    a network interface for sending and receiving information over the wide-area network;
    a memory for storing processor-executable instructions; and
    a processor coupled to the geolocation module, the network interface, and the memory for executing the processor-executable instructions that causes the server to;
        receive, by the processor via the network interface, a request from the remote game player via the client device to participate in an online game hosted by the server;
        send, by the processor via the network interface, instructions for the remote game player to physically manipulate the client device;
        determine, by the geolocation module, positions of the client device as the remote game player manipulates the client device over time;
        verify, by the processor, an actual location of the client device based on the positions of the client device as the remote game player physically manipulates the client device, wherein, in one embodiment, the instructions for verifying the actual location comprise instructions that cause the server to;
            receive, by the processor via the network interface, GPS coordinates of the client device from the client device as the remote game player physically manipulates the client device;
            determine, by the processor, a rate at which the GPS coordinates are received;
            compare, by the processor, the rate at which the GPS coordinates are received to an expected rate; and
            verify, by the processor, the actual location of the client device when the rate at which the GPS coordinates are received matches the expected rate; and;
        grant to the client device, by the processor, access to the online game after the actual location of the client device has been verified.

2. The server of claim 1, wherein the instructions comprises an instruction to rotate the client device to a randomly-generated angle.

3. The server of claim 1, wherein the instructions comprises an instruction to move the client device to a randomly-generated direction.

4. The server of claim 1, wherein the processor-executable instructions that causes the processor to verify the actual location of the client device, in another embodiment, comprises instructions that causes the processor to:
compare, by the processor, the positions of the client device as the remote game player physically manipulates the client device with expected manipulations based on the instructions; and
verify, by the processor, the actual location of the client device when the positions of the client device as the remote game player physically manipulates the client device matches the expected manipulations.

5. The server of claim 1, wherein the processor-executable instructions further comprise instructions that causes the server to:
determine, by the processor, when at least one of the positions is within a geographic area where the online game is permitted; and
grant to the client device, by the processor, access to the online game when the positions of the client device matches the expected positions and at least one of the positions is within the geographic area.

6. The server of claim 1, wherein the processor-executable instructions further comprise instructions that causes the server to:
receive, by the processor via the network interface, an unverified position of the client device;
determine, by the processor, that at least one of the positions does not match the unverified position; and
deny to the client device, by the processor, access to the online game when the at least one of the positions does not match the unverified position.

7. The server of claim 1, wherein the processor-executable instructions further comprise instructions that causes the server to:
determine, by the processor, an identification of the client device; and
update, by the processor, a blacklist stored in the memory, the blacklist comprising a list of client device identifications associated with client devices that are not permitted to access the online game.

8. The server of claim 7, wherein the processor-executable instructions further comprise instructions that causes the server to:
in response to receiving the request to play the online game, compare the identification of the client device with the client device identifications stored in the blacklist; and
deny to the client device, by the processor, access to the online game when the identification of the client device matches one of the client device identifications stored in the blacklist.

9. The server of claim 1, wherein the processor-executable instructions further comprise instructions that causes the server to:
determine, by the processor via a signal received from a second client device, a location of the second client device, the second client device lacking a self-determining position capability;
send, by the processor via the network interface, a first code to a second client device;
receive, by the processor, a second code from the client device within a predetermined time from sending the first code;
determine, by the processor, that the second code matches the first code;
in response to determining that the second code matches the first code, determine, by the processor, a distance between the location of the second client device and the location of the client device;
determine, by the processor, that the distance is less than a predetermined distance; and
grant to the second client device, by the processor, access to the online game when the distance is less than a predetermined distance.

10. A method, performed by a server, for verifying a location of a remote game player using a client device coupled to the server via a wide-area network, comprising:
receiving, by a processor via a network interface coupled to the processor, a request from the remote game player via the client device to participate in an online game hosted by the server;
sending, by the processor via the network interface, instructions for the remote game player to physically manipulate the client device;
determining, by a geolocation module coupled to the processor, positions of the client device as the remote game player manipulates the client device over time;
determining, by the processor, that the positions of the client device match expected positions associated with the instructions;
receiving, by the processor via the network interface, GPS coordinates of the client device from the client device as the remote game player physically manipulates the client device;
determining, by the processor, a rate at which the GPS coordinates are received;
comparing, by the processor, the rate at which the GPS coordinates are received to an expected rate;
verifying, by the processor, in one embodiment, an actual location of the client device when the rate at which the GPS coordinates are received matches the expected rate; and
granting to the client device, by the processor, access to the online game when the actual location of the client device has been verified.

11. The method of claim 10, wherein the instructions comprises an instruction to rotate the client device to a randomly-generated angle.

12. The method of claim 10, wherein the instructions comprises an instruction to move the client device to a randomly-generated direction.

13. The method of claim 10, wherein verifying the actual location of the client device, in another embodiment, comprises:
comparing, by the processor, the positions of the client device as the remote game player physically manipulates with expected manipulations based on the instructions; and
verifying, by the processor, the actual location of the client device when the positions of the client device as the remote game player physically manipulates the client device matches the expected manipulations.

14. The method of claim 10, further comprising:
determining, by the processor, when at least one of the positions is within a geographic area where the online game is permitted; and granting to the client device, by the processor, access to the online game when the positions of the client device matches the expected positions and at least one of the positions is within the geographic area.

15. The method of claim 10, further comprising:

receiving, by the processor via the network interface, an unverified position of the client device;

determining, by the processor, that at least one of the positions does not match the unverified position; and denying to the client device, by the processor, access to the online game when the at least one of the positions does not match the unverified position.

16. The method of claim 10, further comprising:

determining, by the processor, an identification of the client device; and updating, by the processor, a blacklist stored in the memory, the blacklist comprising a list of client device identifications associated with client devices that are not permitted to access the online game.

17. The method of claim 16, further comprising:

in response to receiving the request to play the online game, comparing the identification of the client device with the client device identifications stored in the blacklist; and denying to the client device, by the processor, access to the online game when the identification of the client device matches one of the client device identifications stored in the blacklist.

18. The method of claim 10, further comprising:

determining, by the processor via a signal received from a second client device, a location of the second client device, the second client device lacking a self-determining position capability;

sending, by the processor via the network interface, a first code to a second client device;

receiving, by the processor, a second code from the client device within a predetermined time from sending the first code;

determining, by the processor, that the second code matches the first code;

in response to determining that the second code matches the first code, determining, by the processor, a distance between the location of the second client device and the location of the client device;

determining, by the processor, that the distance is less than a predetermined distance; and granting to the second client device, by the processor, access to the online game when the distance is less than a predetermined distance.

* * * * *